Nov. 12, 1929. M. L. ANSEL 1,735,663
CONDUIT FITTING
Filed March 9, 1927
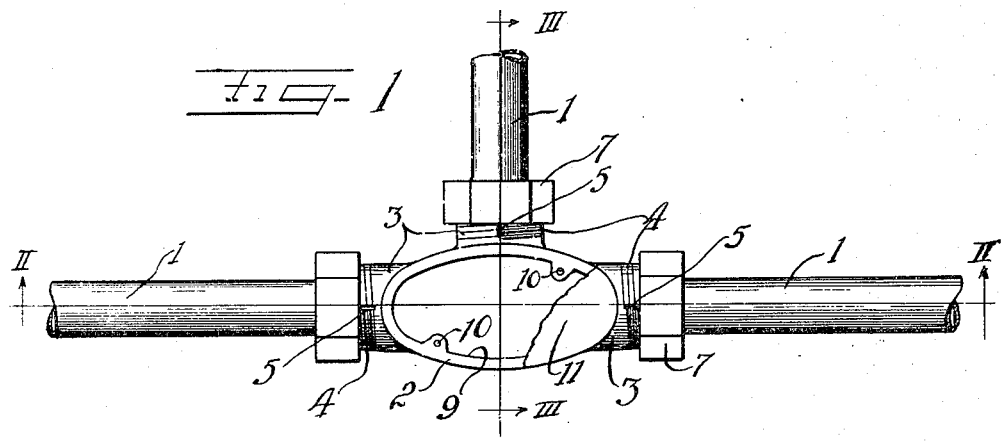
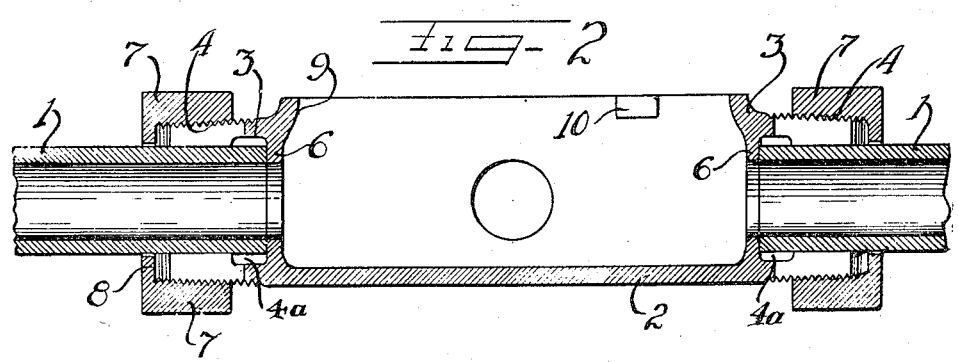
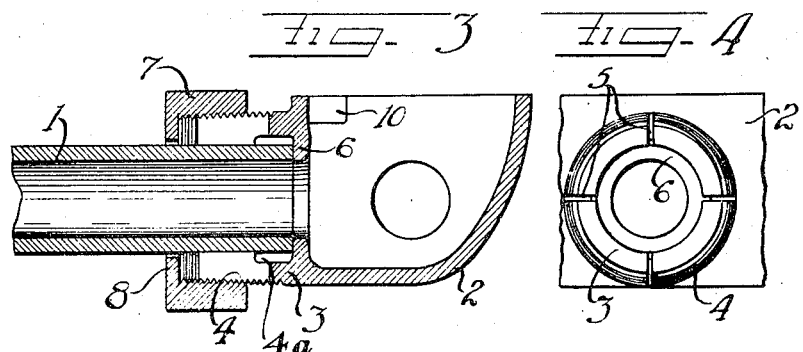
INVENTOR
Murry L. Ansel
by Charles W. Hills
Attys Patented Nov. 12, 1929

1,735,663

UNITED STATES PATENT OFFICE

MURRY L. ANSEL, OF CHICAGO, ILLINOIS, ASSIGNOR TO J. LIVINGSTON & CO., A CORPORATION OF NEW YORK

CONDUIT FITTING

Application filed March 9, 1927. Serial No. 173,835.

In using conduit fittings or unions for connecting a plurality of conduits or pipes it has been the custom to provide fittings or unions with the arms thereof internally threaded to permit the same to have the externally threaded ends of conduits or pipes threaded therein. This arrangement has not proven entirely satisfactory due to the fact that considerable time is required to mount the fittings or unions in place, and difficulties are encountered since it often occurs that the threaded ends of the pipes will not fit the threaded openings in the fittings or unions.

To obviate the above conditions this invention has been devised for the purpose of providing an improved conduit fitting or union each arm of which is provided with an internal stop flange positioned to the inside of an externally threaded longitudinally split section on which a flanged nut is adapted to be engaged to frictionally clamp a conduit or pipe in place with one end of said pipe abutting said stop flange.

It is an object of this invention to provide a conduit fitting constructed to permit the ends of plain conduits or pipes to be seated therein and frictionally held in place by externally threaded split sleeves and lock nuts.

It is also an object of this invention to provide a conduit fitting or union so constructed that the ends of conduits are adapted to be slidably engaged in openings in said fitting and frictionally clamped in position by means of lock nuts which are threaded on split threaded extensions surrounding said pipes and forming integral parts of said fitting or union.

It is an important object of this invention to provide an improved simplified form of conduit fitting adapted to be easily mounted in place to connect a plurality of conduits without necessitating threading of the pipes into threaded openings in said fitting.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view of a conduit fitting embodying the principles of this invention having the cover plate removed and showing a plurality of conduits connected by means of said fitting.

Figure 2 is an enlarged longitudinal section of the device taken on line II—II of Figure 1.

Figure 3 is an enlarged transverse section of the device taken on line III—III of Figure 1.

Figure 4 is a fragmentary end view of one end of the conduit fitting with the lock nut removed.

As shown on the drawings:

The reference numeral 1 indicates a plurality of pipes or conduits the ends of which are plain and free from either external or internal threads. The pipes 1 are adapted to be removably connected one to the other by means of improved conduit fitting or union embodying the principles of this invention and comprising a box or casing 2 having a plurality of arms or extensions 3 integrally formed thereon, in this particular instance arranged in a T-shape with an intermediate arm positioned at right angles with respect to the end arms. Each of the arms 3 has the outer section 4 thereof externally threaded and provided with a plurality of longitudinally directed cuts or slots 5 dividing the outer end of each of said sleeves into a plurality of tongues or segments. Integrally formed in each of the sleeves 3, where said sleeve joins the box or casing 2, is an inwardly directed stop flange 6 against which one end of a conduit or pipe 1 is adapted to abut or seat when projected through the externally threaded split section 4 of an arm. An internal groove 4ª is formed in the sleeve 4 contiguous to the stop flange 6 and for a purpose that will appear hereinafter. Slidably engaged on each of the pipe or conduit ends is a lock or clamping nut 7 one end of which is open while the other end is provided with an apertured flange 8 through which the pipe or conduit 1 projects. The internal threaded portion of each of the lock nuts 7 is tapered to correspond with the taper of the externally threaded portion 4 of the respective arm 3 so that after a pipe or conduit 1 has been projected into one of the arms 3 of the fitting the nut 7 is adapted to be threaded onto the split tapered externally threaded portion 4 of said arm to cause the split sections to be moved into frictional clamping engagement with the conduit or pipe 1 to hold the same rigidly clamped in position with the end of the pipe or conduit abutting against the stop flange 6. As illustrated in Figure 1, one side of the casing or box 2 is provided with an opening 9 which is adapted to be closed by means of an apertured closure plate or cover 11 adapted to be held in place by means of screws the ends of which are adapted to be threaded into internally threaded lugs or projections 10 integrally formed within the casing or box at diagonally opposite points in said opening 9.

While a T-shaped conduit fitting or union is illustrated and described, it will, of course, be understood that conduit fittings of different shapes and styles may be constructed according to the principles of this invention to permit plain conduits or pipes to be projected therein and frictionally clamped between the segments of an externally threaded tapered sleeve or arm by means of a lock or clamping nut of the type illustrated and described. The improved conduit fitting is of a simplified construction and permits conduits or pipes to be quickly engaged therein in proper relation and frictionally locked in place by means of the retaining nuts.

The improved conduit fitting may thus be easily mounted in place without requiring the conduits or pipes to be rotated or threaded into threaded openings in the fitting as has been the custom heretofore. It will also be noted that in using an improved conduit fitting of the type described that it is not necessary to rotate either the pipes or conduits or the conduit fitting when it is desired to connect said pipes and fitting. It will be particularly noted that, because of the internal groove 4ª, in the sleeve 4, the sleeve comprises, in effect, a plurality of pipe-clamping jaws anchored to the box or casing through relatively thin flexible members. The recess formed by the internal groove 4ª admits of a pipe having a burred or ridged end being entered in the sleeve and of the housing of the ridge in the recess, and packing may be positioned in the recess to make the sleeve weather-tight.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

A conduit fitting for threadless conduit comprising a housing, a split outwardly extending sleeve integral therewith, the said sleeve having an internal annular groove whereby to reduce the thickness of the wall of said sleeve at its inner end to facilitate outward flexing of the split portions of said sleeve, and means engaging said sleeve adapted to compress the same.

In testimony whereof I have hereunto subscribed my name at Detroit, Wayne County, Michigan.

MURRY L. ANSEL.